United States Patent
Peri

(10) Patent No.: US 10,657,194 B1
(45) Date of Patent: May 19, 2020

(54) SYSTEM AND METHOD FOR CODED PATTERN COMMUNICATION

(71) Applicant: Samsung Electronics Co., Ltd., Suwon-si, Gyeonggi-do (KR)

(72) Inventor: Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/362,375

(22) Filed: Mar. 22, 2019

Related U.S. Application Data

(60) Provisional application No. 62/757,062, filed on Nov. 7, 2018.

(51) Int. Cl.
| | |
|---|---|
| *H04W 24/00* | (2009.01) |
| *G06F 16/955* | (2019.01) |
| *G06F 16/9537* | (2019.01) |
| *H04L 29/06* | (2006.01) |
| *G06K 7/14* | (2006.01) |
| *G06T 19/00* | (2011.01) |

(52) U.S. Cl.
CPC ...... *G06F 16/9554* (2019.01); *G06F 16/9537* (2019.01); *G06K 7/1417* (2013.01); *G06T 19/006* (2013.01); *H04L 65/4084* (2013.01)

(58) Field of Classification Search
CPC ....... H04W 64/00; H04W 4/02; H04W 88/02; H04M 1/72519; H04M 1/72583
USPC ..................... 455/566, 557, 456.1
See application file for complete search history.

(56) References Cited

U.S. PATENT DOCUMENTS

| | | |
|---|---|---|
| 10,019,214 B2 | 7/2018 | Cronin |
| 2006/0238550 A1 | 10/2006 | Page |
| 2013/0050259 A1 | 2/2013 | Ahn et al. |
| 2014/0160157 A1 | 6/2014 | Poulos et al. |
| 2016/0037573 A1 | 2/2016 | Ko et al. |
| 2017/0061700 A1 | 3/2017 | Urbach et al. |
| 2017/0116644 A1 | 4/2017 | Huang et al. |
| 2017/0213377 A1 | 7/2017 | Torii et al. |
| 2018/0091304 A1* | 3/2018 | Brook ................ G06K 7/10762 |
| 2018/0095708 A1 | 4/2018 | Black et al. |
| 2018/0246328 A1 | 8/2018 | Song et al. |

FOREIGN PATENT DOCUMENTS

| | | |
|---|---|---|
| KR | 1020170035130 A | 3/2017 |
| WO | 2015192117 A1 | 12/2015 |

* cited by examiner

*Primary Examiner* — Temica M Beamer

(57) ABSTRACT

An apparatus includes at least one image sensor configured to capture a plurality of images, at least one communication interface, at least one display, and at least one processor coupled to the at least one image sensor, the at least one communication interface, and the at least one display. The at least one processor is configured to identify a network address encoded into one or more first images of the plurality of captured images and transmit a first request to the network address. The at least one processor is also configured to identify a unique identifier encoded into one or more second images of the plurality of captured images and transmit a second request containing the unique identifier. The at least one processor is further configured to receive session information and output, to the at least one display, extended reality-related content obtained during a session associated with the session information.

20 Claims, 9 Drawing Sheets

SYSTEM AND METHOD FOR CODED PATTERN COMMUNICATION

CROSS-REFERENCE TO RELATED APPLICATION AND PRIORITY CLAIM

This application claims priority under 35 U.S.C. § 119(e) to U.S. Provisional Patent Application No. 62/757,062 filed on Nov. 7, 2018, which is hereby incorporated by reference in its entirety.

TECHNICAL FIELD

This disclosure relates generally to optical systems. More specifically, this disclosure relates to a system and method for coded pattern communication.

BACKGROUND

Virtual reality (VR), augmented reality (AR), and mixed reality (MR) technologies are becoming more and more common as the availability of VR, AR, and MR headsets and other devices continues to expand. Virtual reality generally refers to technology that creates an artificial simulation or recreation of an environment, which may or may not be a real-world environment. Augmented reality generally refers to technology in which computer-generated content is superimposed over a real-world environment. Mixed reality generally refers to technology in which computer-generated content is superimposed over or replaces a real-world environment, where computer-generated objects are anchored to or interact with physical objects in the real-world environment. In some cases, multiple users may need to be localized in the same space in order to share a common experience. For example, multiple users playing the same game or otherwise participating in the same experience may (i) need to be authorized or authenticated in order to participate in the experience and (ii) need to have their locations determined relative to a known location in order to participate in the experience from their different positions.

SUMMARY

This disclosure provides a system and method for coded pattern communication.

In a first embodiment, an apparatus includes at least one image sensor configured to capture a plurality of images, at least one communication interface, at least one display, and at least one processor coupled to the at least one image sensor, the at least one communication interface, and the at least one display. The at least one processor is configured to identify a network address encoded into one or more first images of the plurality of captured images and transmit a first request to the network address. The at least one processor is also configured to identify a unique identifier encoded into one or more second images of the plurality of captured images and transmit a second request containing the unique identifier. The at least one processor is further configured to receive session information and output, to the at least one display, extended reality-related content obtained during a session associated with the session information.

In a second embodiment, a method includes identifying a network address encoded into one or more first captured images using at least one processor and transmitting a first request to the network address. The method also includes identifying a unique identifier encoded into one or more second captured images using the at least one processor and transmitting a second request containing the unique identifier. The method further includes receiving session information and outputting extended reality-related content obtained during a session associated with the session information using the at least one processor.

In a third embodiment, an apparatus includes at least one communication interface and at least one processor coupled to the at least one communication interface. The at least one processor is configured to generate one or more first optical patterns encoding a network address and output, to at least one display, the one or more first optical patterns. The at least one processor is also configured to receive a first request at the network address from an electronic device and generate a unique identifier. The at least one processor is further configured to generate one or more second optical patterns encoding the unique identifier and output, to the at least one display, the one or more second optical patterns.

In a fourth embodiment, a method includes generating one or more first optical patterns encoding a network address using at least one processor and outputting, to at least one display, the one or more first optical patterns. The method also includes receiving a first request at the network address from an electronic device and generating a unique identifier using the at least one processor. The method further includes generating one or more second optical patterns encoding the unique identifier using the at least one processor and outputting, to the at least one display, the one or more second optical patterns.

In a fifth embodiment, a non-transitory computer readable medium contains computer readable program code that, when executed, causes at least one processor to perform the method of the second aspect or any of its dependent claims. In a sixth embodiment, a non-transitory computer readable medium contains computer readable program code that, when executed, causes at least one processor to perform the method of the fourth aspect or any of its dependent claims.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
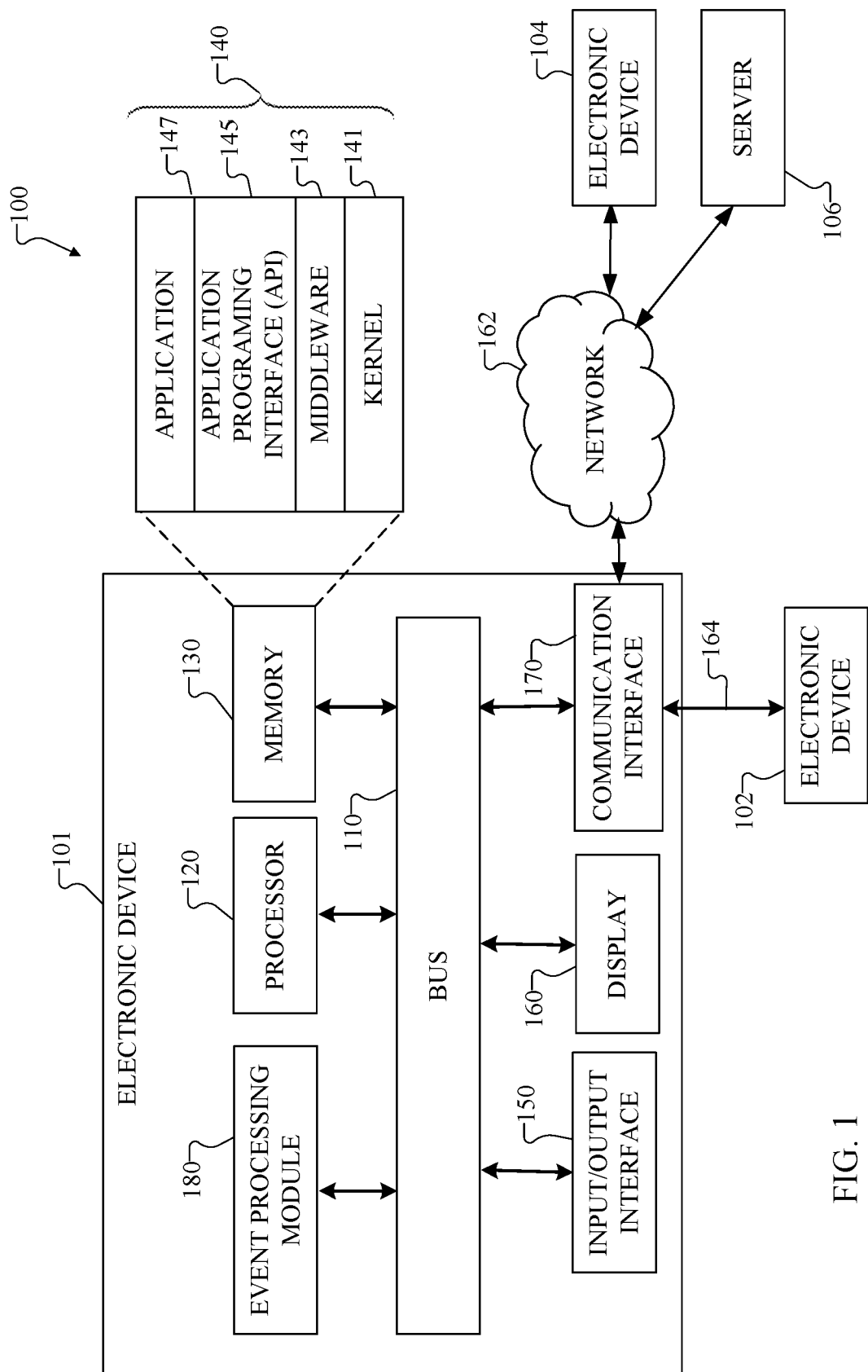
FIG. 1 illustrates an example network configuration in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure.

As noted above, one or more users of virtual reality (VR), augmented reality (AR), and mixed reality (MR) technologies often need to be identified, authenticated/authorized, and localized in a given space, such as to share an experience. VR, AR, and MR technologies may be referred to collectively as extended reality (XR) technologies. XR-related user experiences often require that user devices be able to communicate and exchange "states" and "events" generated and maintained by a system and by participants connected to the system. For AR- and MR-related experiences, each user device also typically needs to be localized with reference to the same reference location and orientation so that the users can view the same content from different angles. Typically, these actions occur using a known Wi-Fi network or other wireless network, where the user devices execute a known application with preset roles that the devices perform and where a pattern is used for the locations of the user devices.

Unfortunately, this approach may require all users to be logged into the same wireless network or cloud-based server at the same time. Such access is not always easy to attain and (in some cases) is not available at all, such as when all users cannot access the same local wireless network. As a particular example, access to a local Wi-Fi network may be restricted or controlled for security reasons. Moreover, creating a multi-user experience on the fly can be difficult, particularly when the multiple users do not have agreed-upon protocols, security procedures, and user roles already in place. When this occurs, the protocols, security procedures, and user roles often have to be resolved manually or using an application that must be present on all XR devices, which again may require an existing web connection or access to the same wireless network.

This disclosure provides techniques for using optical coded pattern communications in order to allow one or more XR-enabled devices of one or more end users to access a host device and obtain XR-related content. For example, in some embodiments, different optical patterns (such as Quick Response or "QR" codes) can be presented on one or more displays, and one or more XR-enabled devices can be used to view the QR codes or other optical patterns. The optical patterns provide information that can be used by the one or more XR-enabled devices to access XR-related content, such as a network address of the host device, a token associated with a session to be formed with the host device, and session information associated with the session. The optical patterns can also be used to help localize each XR-enabled device in a given space, such as with respect to a reference position defined by the position of the display(s). These techniques can be used with various types of XR-enabled devices, such as head-mounted devices (like XR headsets or glasses) and mobile devices or other devices executing XR-related applications (like tablet computers or smartphones).

In this way, one or more XR-enabled devices can access and view XR-related content and multiple XR-enabled devices can be synchronized without requiring pre-determined access to a wireless network or cloud-based server. This is accomplished by displaying QR codes or other optical patterns that instruct one or more XR-enabled devices how to access the content, how to verify their identities, and how to identify where they are located. As a result, individual users are able to access and use XR-related content much more easily, and multiple users are able to access and use XR-related content and determine their locations relative to a reference position so that the users can see the same content from different angles. Also, security can be enhanced since, in some embodiments, no connection to the Internet may be needed and/or only pre-approved devices may be used. Further, by using locally-displayed optical patterns and locally-accessible host devices, these approaches can help to ensure that only authorized users who are actually present in a given area can access and view XR-related content. In addition, the displayed optical patterns can be dynamic and can change as needed to provide desired information to the XR-enabled devices. Because of this, XR users can be synchronized both in three-dimensional (3D) space and in content, and the optical patterns can be used to help ensure that only authorized users can access content-related data or wireless networks.

It should be noted here that while the following often describes the use of QR codes to provide information to XR-enabled devices, any suitable optical patterns can be used to provide information to XR-enabled devices employing stenographic or other suitable techniques. For example, barcodes or other visible encoding mechanisms may be used to encode information for XR-enabled devices. As other examples, one or more scenic images or backgrounds with embedded information can be used, or at least one scene with movement can be used to convey embedded information (such as by using one or more motion vectors from particular object(s) in a scene, optical labels, coded patters based on color and/or motion, or other techniques). As yet other examples, one or more patterns can be communicated using a non-visual spectrum, such as when an infrared (IR) or ultraviolet (UV) based wavelength or wavelengths are used so that a human visible image does not need to be modified. If IR or UV is used, no display may need to be seen by a user, thus appearing as a blank screen (or other displayed scene). As still other examples, one or more images in which a certain color or colors can be filtered out to obtain at least one hidden pattern can be used, or text information can be obtained from one or more images (such as via optical character recognition). As a further example, information can be hidden in refresh rates that a human eye cannot see but that may be detected by an optical sensor. In general, any suitable technique can be used below to provide information optically to one or more XR-enabled devices, and the encoding that is used may or may not be obfuscated from one or more users of the XR-enabled devices.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may further represent or include one or more lenses or other display surfaces associated with smart glasses or other wearable devices. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101—mountable wearable device (such as a head mounted display (HMD)). When the electronic device 101 is mounted in an HMD (such as the electronic device 102), the electronic device 101 may detect the mounting in the HMD and operate in an XR mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

As described in more detail below, at least one device of the network configuration 100 supports the use of optical coded pattern communication. For example, in some embodiments, the server 106 could be used to generate optical patterns (such as QR codes) that are presented on one or more display screens and that are scanned by one or more of the electronic devices 101, 102, 104. The one or more electronic devices 101, 102, 104 could use the optical patterns to interact with the server 106 in order to identify the electronic devices to the server 106, receive session tokens from the server 106, establish communication sessions with the server 106 or other XR-related content provider, and optionally localize the electronic devices in a given space. In other embodiments, a first of the electronic devices 101, 102, 104 could display optical patterns that other electronic devices 101, 102, 104 can scan. The first electronic device may or may not generate the optical patterns, such as when the first electronic device interacts with the server 106 in order to obtain optical patterns generated by the server 106. The other electronic devices could use the optical patterns to interact with the first electronic device or server 106 in order to establish communication sessions with the first electronic device, server 106, or other XR-related content provider and optionally to localize the other electronic devices in a given space. In this way, one or more electronic devices are able to access and use XR-related content without needing to be pre-configured. As described below, this functionality can be used, modified, or extended to a large number of potential use cases in which optically-encoded data is used by XR-enabled devices to access and retrieve XR-related content. The device that is generating the optical patterns used to transmit information to one or more electronic devices may be referred to below as a "host" electronic device.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
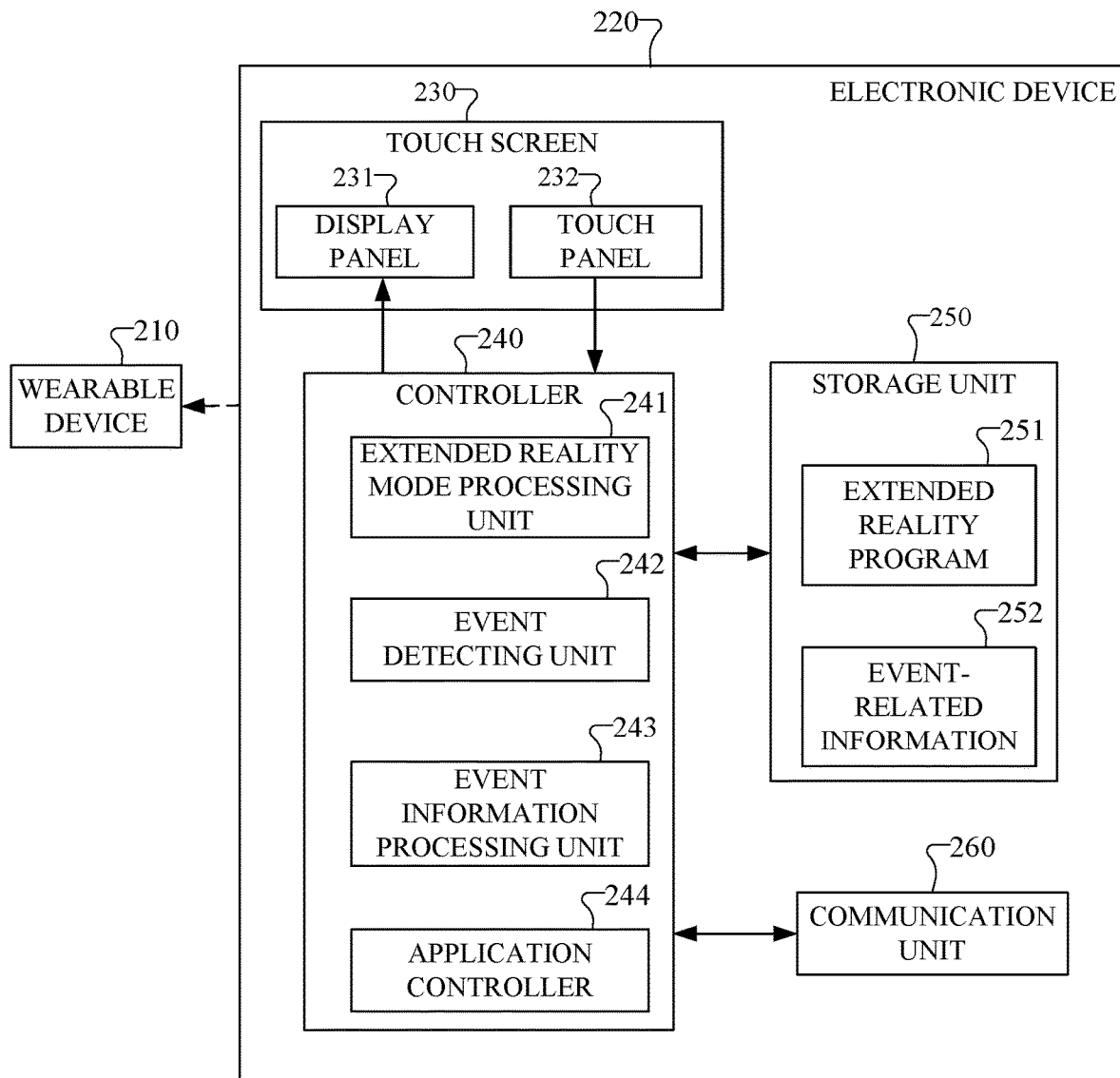
FIG. 2 illustrates an example configuration of an electronic device in accordance with this disclosure.

FIG. 2 illustrates an example configuration of an electronic device 220 in accordance with this disclosure. The electronic device 220 shown in FIG. 2 could, for example, be used as any of the electronic devices 101, 102, 104 shown in FIG. 1 and described above. However, the electronic devices 101, 102, 104 shown in FIG. 1 could be implemented in any other suitable manner. In the following description, the electronic device 220 could be a device primarily performing a display function or could denote a normal electronic device including at least one display. For example, the electronic device 220 could be an electronic device (such as a smartphone or smart watch) having a display.

As shown in FIG. 2, according to embodiments of this disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of an extended reality mode processing unit 241, an event detecting unit 242, an event information processing unit 243, or an application controller 244.

In some embodiments, when the electronic device 220 is mounted in a wearable device 210, the electronic device 220 can operate, for example, as an HMD and run an extended reality mode. Further, according to embodiments of this disclosure, even when the electronic device 220 is not mounted in the wearable device 210, the electronic device 220 can run the extended reality mode according to the user's settings or run an extended reality mode-related application. In the following discussion, although the electronic device 220 is set to be mounted in the wearable device 210 to run the extended reality mode, embodiments of this disclosure are not limited to this specific implementation.

According to some embodiments, when the electronic device 220 operates in the extended reality mode (such as when the electronic device 220 is mounted in the wearable device 210 to operate in a head mounted theater (HMT) mode), two screens corresponding to the user's eyes (left eye and right eye) can be displayed through the display panel 231. Alternatively, if the electronic device 220 represents smart glasses or other wearable device, content can be presented on one or more lenses or other display surfaces associated with the wearable device. Also, according to some embodiments, when the electronic device 220 is operated in the extended reality mode, the controller 240 can control the processing of information related to an event generated while operating in the extended reality mode to fit in the extended reality mode and display the processed information. Further, according to some embodiments, when the event generated while operating in the extended reality mode is an event related to running an application, the controller 240 can block the running of the application or process the application to operate as a background process or application.

As noted above, the controller 240 can include at least one of the extended reality mode processing unit 241, the event detecting unit 242, the event information processing unit 243, or the application controller 244 to perform functions according to various embodiments of this disclosure. Embodiments of this disclosure can be implemented to perform various operations or functions as described below using at least one component of the electronic device 220, such as the touchscreen 230, controller 240, or storage unit 250.

According to some embodiments, when the electronic device 220 is mounted in the wearable device 210 or the extended reality mode is run according to the user's setting or as an extended reality mode-related application runs, the extended reality mode processing unit 241 can process various functions related to the operation of the extended reality mode. The extended reality mode processing unit 241 can load at least one extended reality program 251 stored in the storage unit 250 to perform various functions.

The event detecting unit 242 determines or detects that an event is generated while operated in the extended reality mode by the extended reality mode processing unit 241. Also, the event detecting unit 242 can determine whether there is information to be displayed on the display screen of the electronic device 220 (such as the touchscreen 230) in relation with an event generated while operating in the extended reality mode. Further, the event detecting unit 242 can determine that an application is to be run in relation with an event generated while operating in the extended reality mode. Various embodiments of an application related to the type of event are described below.

The event information processing unit 243 can process the event-related information to be displayed on the display screen to fit the extended reality mode when there is information to be displayed in relation with an event occurring while operating in the extended reality mode (depending on the result of the determination by the event detecting unit 242). Various methods for processing event-related information can apply. For example, when a three-dimensional (3D) image is implemented in the extended reality mode, the electronic device 220 may convert the event-related information to fit the 3D image. As a particular example, event-related information being displayed in two dimensions (2D) can be converted into left and right eye information corresponding to the 3D image, and the converted information can be synthesized and displayed on the display screen of the extended reality mode being currently run.

According to some embodiments, when it is determined by the event detecting unit 242 that there is an application to be run in relation with the event occurring while operating in the extended reality mode, the application controller 244 may perform control to block the running of the application related to the event. Also, according to some embodiments, when it is determined by the event detecting unit 242 that there is an application to be run in relation with the event occurring while operating in the extended reality mode, the application controller 244 may perform control so that the application is run in the background so as not to influence the running or screen display of the application corresponding to the extended reality mode when the event-related application runs.

The storage unit 250 can store the extended reality program 251. The extended reality program 251 can be an application related to the extended reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

In some embodiments, the wearable device 210 can be an electronic device including at least one function of the electronic device 101 shown in FIG. 1, and the wearable device 210 can be a wearable stand to which the electronic device 220 can be mounted. In cases where the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether it has been mounted on the wearable device 210 for communication with the wearable device 210 and can determine whether to operate in the extended reality mode (or an HMT mode). According to some embodiments, upon failure to automatically determine whether the electronic device 220 is mounted when the communication unit 260 is mounted on the wearable device 210, the user can run the extended reality program 251 or select the extended reality mode (or the HMT mode). Also, according to some embodiments, when the wearable device 210 functions with or as part of the electronic device 220, the wearable device 210 can be implemented to automatically determine whether the electronic device 220 is mounted on the wearable device 210 and enable the running mode of the electronic device 220 to automatically switch to the extended reality mode (or the HMT mode).

At least some functions of the controller 240 shown in FIG. 2 can be included in the event processing module 180 or processor 120 of the electronic device 101 shown in FIG. 1. Also, the touchscreen 230 or display panel 231 shown in FIG. 2 can correspond to the display 160 of FIG. 1. Further, the storage unit 250 shown in FIG. 2 can correspond to the memory 130 of FIG. 1. While the touchscreen 230 in FIG.

2 includes the display panel 231 and the touch panel 232, according to other embodiments of this disclosure, the display panel 231 or the touch panel 232 may also be provided as a separate panel rather than being combined in a single touchscreen 230. Also, according to embodiments of this disclosure, the electronic device 220 can include the display panel 231 but exclude the touch panel 232.

According to some embodiments, the electronic device 220 can be denoted as a first device (or a first electronic device), and the wearable device 210 may be denoted as a second device (or a second electronic device) for ease of description. Also, according to some embodiments, the electronic device 220 can include a display unit (such as the touchscreen 230) that displays on a screen corresponding to an extended reality mode. The electronic device 220 can also include a controller 240 performing control that detects an interrupt according to an occurrence of at least one event, varies event-related information related to the event in a form corresponding to the extended reality mode, and displays the varied event-related information on the display screen that corresponds to the extended reality mode. According to some embodiments, the event can include any one or more selected from among a call reception event, a message reception event, an alarm notification, a scheduler notification, a Wi-Fi connection, a Wi-Fi disconnection, a low battery notification, a data permission or use restriction notification, a no application response notification, or an abnormal application termination notification.

According to some embodiments, the electronic device 220 further includes a storage unit 250 configured for storing the event-related information when the event is not an event to be displayed in the extended reality mode, where the controller 240 can perform control to display the event-related information stored in the storage unit 250 when the electronic device 220 switches from an extended reality mode into a non-extended reality mode. Also, according to some embodiments, the electronic device 220 can further include a storage unit 250 that stores information regarding at least one event to be displayed in the extended reality mode. According to some embodiments, the event can include an instant message reception notification event. According to some embodiments, when the event is an event related to running at least one application, the controller 240 can perform control that blocks running of the application according to occurrence of the event. According to some embodiments, the controller 240 can perform control to run the blocked application when a screen mode of the electronic device switches from an extended reality mode into a non-extended reality mode. According to some embodiments, when the event is an event related to running at least one application, the controller 240 can perform control that enables the application, according to the occurrence of the event, to be run on a background of a screen of the extended reality mode. According to some embodiments, when the electronic device 220 is connected with a wearable device 210, the controller 240 can perform control to run the extended reality mode. According to some embodiments, the controller 240 can enable the event-related information to be arranged and processed to be displayed in a 3D space of the extended reality mode screen being displayed on a current display screen. According to some embodiments, the electronic device 220 can include additional sensors, such as one or more red, green, blue (RGB) cameras, dynamic vision sensor (DVS) cameras, 360 degree cameras, or a combination thereof.

Although FIG. 2 illustrates one example of a configuration of an electronic device 220, various changes may be made to FIG. 2. For example, computing and communication devices come in a wide variety of configurations, and FIG. 2 does not limit this disclosure to use with this one specific implementation of an electronic device 220.

Figure 3:
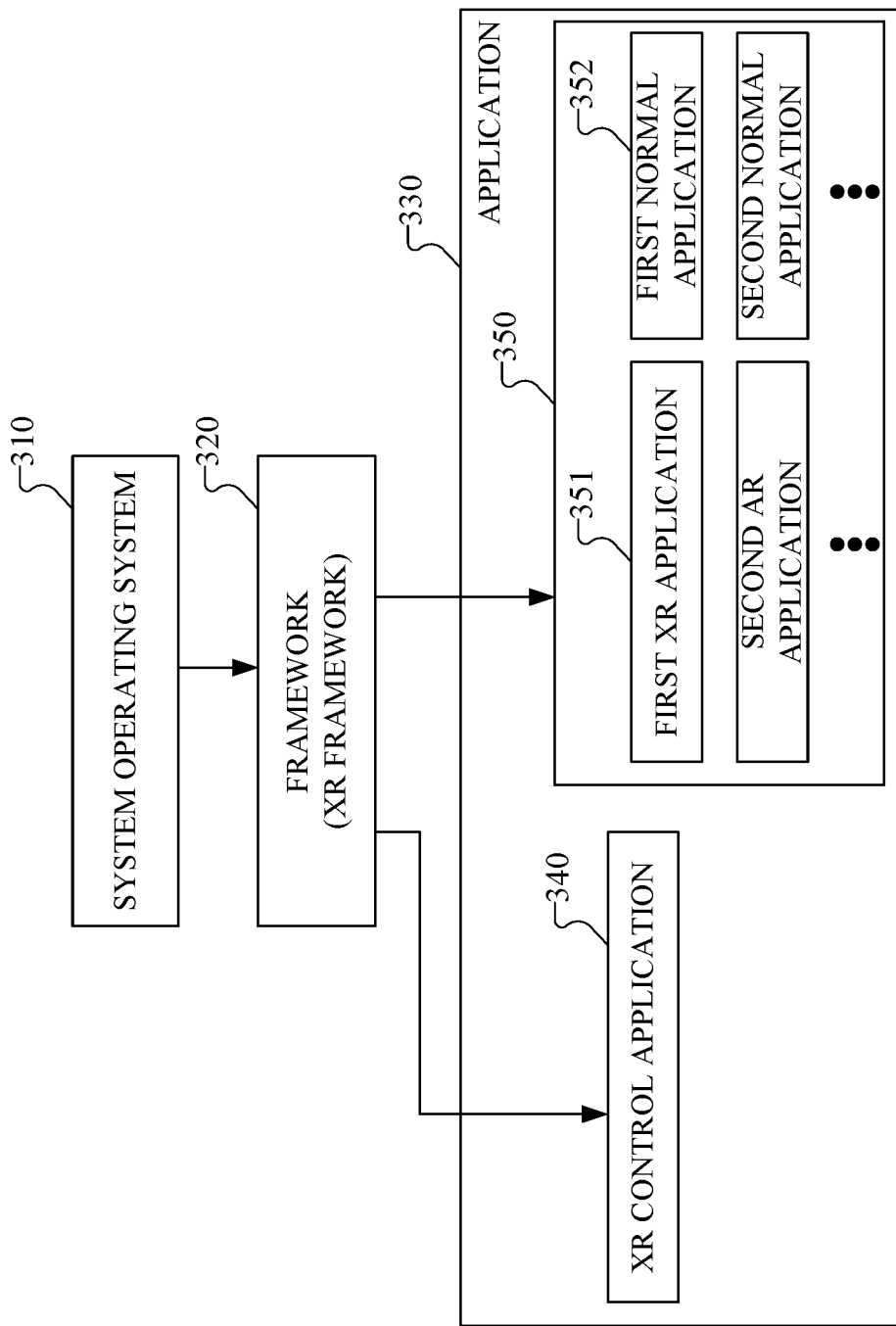
FIG. 3 illustrates an example program module in accordance with this disclosure.

FIG. 3 illustrates an example program module in accordance with this disclosure. The program module shown in FIG. 3 could, for example, be used in any of the electronic devices 101, 102, 104, 220 shown in FIGS. 1 and 2 and described above. However, the electronic devices 101, 102, 104, 220 shown in FIGS. 1 and 2 could be implemented in any other suitable manner.

As shown in FIG. 3, the program module in this example can include a system operating system (OS) 310, a framework 320, and at least one application 330. The system OS 310 can include at least one system resource manager or at least one device driver. The system resource manager can perform, for example, control, allocation, or recovery of system resources. The system resource manager may include at least one manager, such as a process manager, memory manager, or file system manager. The device driver may include at least one driver, such as, for example, a display driver, camera driver, BLUETOOTH driver, shared memory driver, USB driver, keypad driver, Wi-Fi driver, audio driver, or inter-process communication (IPC) driver.

According to some embodiments, the framework 320 (such as middleware) can provide, for example, functions commonly required by an application or provide the application with various functions through an API to allow the application to efficiently use limited system resources inside an electronic device. The XR framework included in the framework 320 can control functions related to extended reality mode operations on the electronic device. For example, when running an extended reality mode operation, the XR framework 320 can control at least one XR application 351, which is related to some form of extended reality, among applications 330 so as to provide the extended reality mode on the electronic device.

The application(s) 330 can include a plurality of applications and can include at least one XR application 351 running in the extended reality mode and at least one normal application 352 running in a non-extended reality mode. The application(s) 330 can further include an XR control application 340. An operation of the at least one XR application 351 and/or at least one normal application 352 can be controlled by the XR control application 340.

When at least one event occurs while the electronic device operates in the extended reality mode, the system OS 310 can notify the framework 320, such as the XR framework, of an occurrence of an event. The framework 320 can then control the running of the normal application 352 so that event-related information can be displayed on the screen for the event occurring in the non-extended reality mode but not in the extended reality mode. When there is an application to be run in relation with the event occurring in the normal mode, the framework 320 can perform or provide control to run at least one normal application 352.

According to some embodiments, when an event occurs while operating in the extended reality mode, the framework 320, such as the XR framework, can block the operation of at least one normal application 352 to display the information related to the occurring event. The framework 320 can provide the event occurring, while operating in the extended reality mode, to the XR control application 340. The XR control application 340 can process the information related to the event occurring while operating in the extended reality mode to fit within the operation of the extended reality mode. For example, 2D planar event-related information can be processed into 3D information. The XR control application 340 can control at least one XR application 351 currently running and can perform control to synthesize the processed event-related information for display on the screen being run by the XR application 351 and display the result.

According to some embodiments, when an event occurs while operating in the extended reality mode, the framework 320 can perform control to block the running of at least one normal application 352 related to the occurring event. Also, according to some embodiments, when an event occurs while operating in the extended reality mode, the framework 320 can perform control to temporarily block the running of at least one normal application 352 related to the occurring event, and then (when the extended reality mode terminates) the framework 320 can perform control to run the blocked normal application 352. Further, according to some embodiments, when an event occurs while operating in the extended reality mode, the framework 320 can control the running of at least one normal application 352 related to the occurring event so that the at least one normal application 352 related to the event operates in the background so as not to influence the screen used by the XR application 351 currently running.

Although FIG. 3 illustrates one example of a program module that can be used in an electronic device, various changes may be made to FIG. 3. For example, the program module can include any suitable number of XR-related applications and any suitable number of non-XR-related applications. Also, embodiments described in connection with FIG. 3 are examples for implementing embodiments of this disclosure in the form of a program, and embodiments of this disclosure are not limited thereto and can be implemented in other various forms.

As noted above, XR-related user experiences often require that user devices be able to communicate and exchange states and events generated and maintained by a system and by participants connected to the system. For AR and MR-related experiences, each user device also typically needs to be localized with reference to the same reference location and orientation so that the users can view the same content from different angles. However, this can be problematic for various reasons, such as when not all user devices can access the same wireless network or cloud-based server or when protocols, security procedures, and user roles need to be resolved manually or using an application that must be present on all XR devices.

To address these types of issues or other issues, the following description describes a system and method designed to allow at least one XR-enabled device to determine an application (such as a native or web-based application) to be used, an IP address or other network address to be accessed, and security validation steps, localization patterns, etc. to be used. Information can be provided optically to the XR-enabled device(s) using a dynamic pattern (such as different QR codes or other optical patterns). It should be noted that while Wi-Fi is used as an example below for allowing XR-enabled devices to communicate, any other suitable wireless technology is also applicable (such as BLUETOOTH or other device-to-device communications, virtual private networks (VPNs), etc.).

Figure 4:
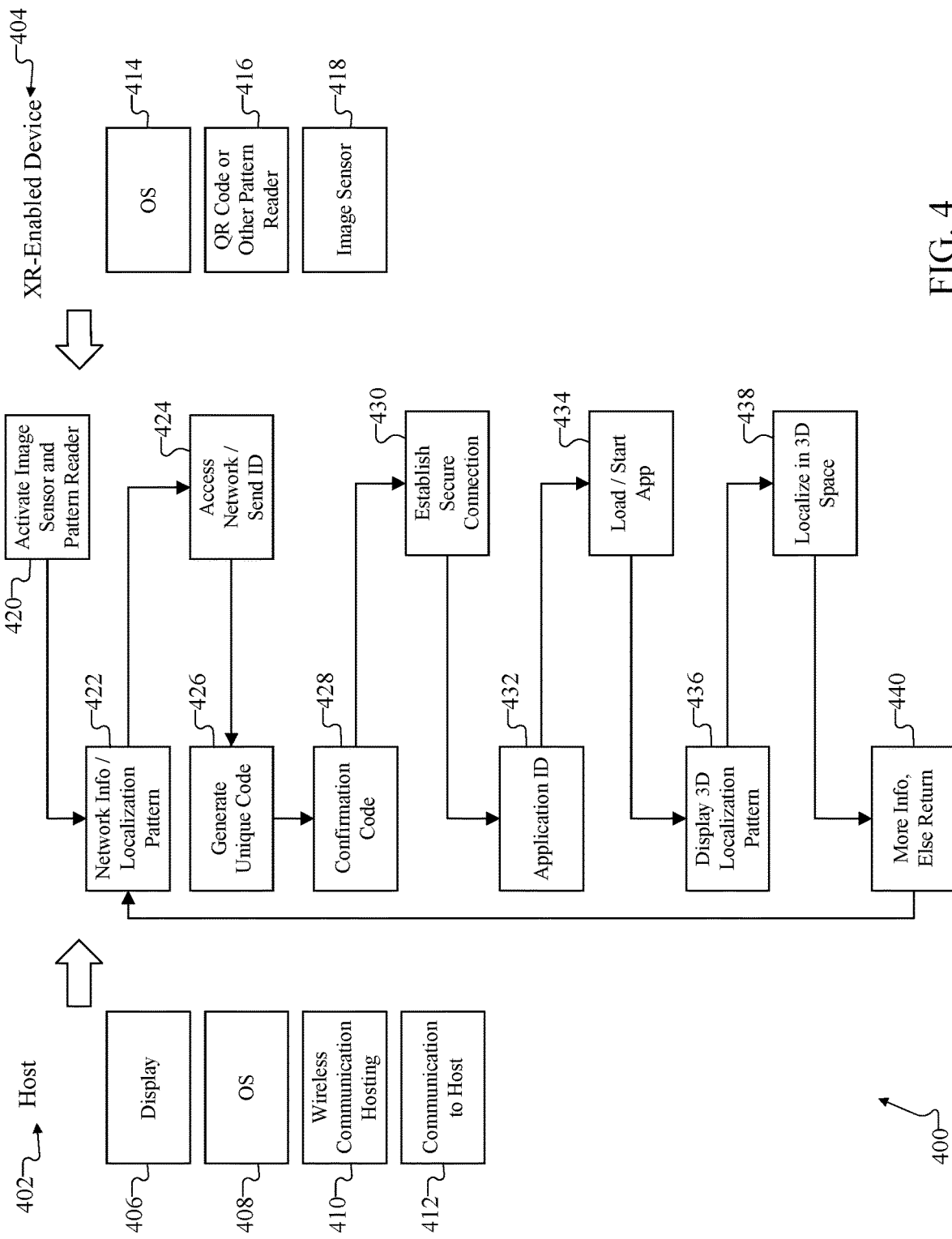
FIG. 4 illustrates an example process for coded pattern communication in accordance with this disclosure.

FIG. 4 illustrates an example process 400 for coded pattern communication in accordance with this disclosure. As shown in FIG. 4, the process 400 generally involves the use of a host electronic device 402 and an XR-enabled end-user electronic device 404. The host device 402 generally refers to an electronic device that generates QR codes or other optical patterns used to communicate with at least one XR-enabled electronic device 404. Each XR-enabled electronic device 404 generally refers to an electronic device that receives information from at least one host device 402 using QR codes or other optical patterns.

In the example shown in FIG. 4, the host device 402 includes or is used in conjunction with a display 406. The display 406 could represent an integral portion of the host device 402, or the display 406 could represent an external display that is coupled to the host device 402. The display 406 includes any suitable display device configured to present at least optical patterns to one or more XR-enabled electronic devices 404, such as a digital display that can change displayed contents on demand. The host device 402 also includes an operating system (OS) 408, which represents any suitable operating system for the host device 402 that supports the use of dynamic displays. Example operating systems could include WINDOWS or LINUX operating systems for computers or ANDROID or IOS operating systems for mobile devices. The host device 402 further includes a wireless communication hosting function 410, which can be used to enable wireless communications involving the host device 402. For instance, the wireless communication hosting function 410 could allow direct Wi-Fi access to the host device 402 or access to the host device 402 via other wireless communications (such as BLUETOOTH or other near-range communications). In addition, the host device 402 includes a host communication function 412, which can be used to support wired communications involving the host device 402. Note that the host device 402 may or may not support both wired and wireless communications. In some embodiments, the host device 402 could represent a digital display 406 having a standalone operating system 408 and optionally an integrated Wi-Fi or other wireless communication system 410. In other embodiments, the host device 402 could be remote from and communicate with the display 406, such as via wired or wireless communications.

In the example shown in FIG. 4, the XR-enabled electronic device 404 includes an operating system (OS) 414, which represents any suitable operating system for the electronic device 404. Example operating systems could include ANDROID or IOS operating systems for mobile devices or WINDOWS, LINUX, or other operating systems used in XR headsets or other XR-related devices. The XR-enabled electronic device 404 also includes an optical pattern reader 416 and at least one camera or other image sensor 418. The image sensor 418 is configured to capture still or video images, and the optical pattern reader 416 is configured to decode any optical patterns sensed in the still or video images. The optical pattern reader 416 can be used to decode any suitable optical patterns, such as QR codes, barcodes, or other graphical images containing encoded data. In some embodiments, the optical pattern reader 416 can represent an application that is executed by at least one processor 120 or controller 240 of the XR-enabled electronic device 404. Also, in some embodiments, the XR-enabled electronic device 404 can be configured to execute an application as required by the host device 402 and can communicate wirelessly with the host device 402.

The display 406 here is used to present optical patterns that have been predefined or otherwise encoded using optical codes to communicate information to one or more XR-enabled electronic devices 404. In some embodiments, the optical patterns are displayed in a certain order to communicate relevant information to the appropriate device 404 at the appropriate time. For example, a large billboard display could show a first QR code or other optical pattern that loads an XR-capable webpage. A user holding an XR-enabled electronic device 404 can initiate the pattern reader 416 to read the first optical pattern on the display 406. This could provide an IP address, web address, or other network address with an extension to indicate specifics of a session at that time and location.

Once the information in the first optical pattern is decoded, the XR-enabled electronic device 404 can open a web browser or other application that accesses the network address and passes attributes decoded from the first optical pattern. Along with these attributes, normal browser session data that is standard from all modern browsers could be read by the host device 402, or other information about the XR-enabled electronic device 404 can be obtained by the host device 402 in any suitable manner. For example, after the user with the XR-enabled electronic device 404 has pointed the image sensor 418 at the first optical pattern and obtained the network address and the extension, the XR-enabled electronic device 404 could generate a HyperText Transport Protocol (HTTP) or other request using that information. As a particular example, the XR-enabled electronic device 404 could generate an HTTP request such as the following with information from the first optical pattern:

192.168.0.0.23/
  gameid=43&location=goldengatepark&session=9 where the network address (192.168.0.23 in this example) provides access to a specific host device 402 (such as one having Wi-Fi/router capabilities). The other attributes (such as gameid, location, and session information) help to identify a specific session at a specific location and time.

When the host device 402 receives the request from the XR-enabled electronic device 404, the host device 402 generates a unique identifier, such as a unique token, based on the XR device's browsers attributes or other information associated with the XR-enabled electronic device 404. This identifier is converted into a second QR code or other optical pattern and presented on the display 406. The XR-enabled electronic device 404 reads the second optical pattern via the image sensor 418 and sends a new request with the token back to the host device 402. As a particular example, the XR-enabled electronic device 404 could generate another HTTP request such as the following in response to decoding a token from the second optical pattern:

192.168.0.23/
  gameid=43&token=84jjf997052mm39742lso93

The host device 402 can check that the token in the second request from the XR-enabled electronic device 404 has the same digital footprint as the previous request. If there is a match, the host device 402 can send session information or redirect the XR-enabled electronic device 404 to a new network address or host for further security. The information provided to the XR-enabled electronic device 404 here can include application code, content, or simply a webpage having XR-related content. Once the XR-enabled electronic device 404 loads the application or webpage, an application on the XR-enabled electronic device 404 can instruct the user to look at the display 406 again to localize the user to a common 3D orientation. The host device 402 can display a third optical pattern or some other content on the display 406, which the user of the XR-enabled electronic device 404 (and possibly all users of all XR-enabled electronic devices 404 in the area) can view in order to determine each user's position relative to the display 406. This allows all XR-enabled electronic devices 404 that are participating in an experience to see the same things at the same time from different orientations. If any other information needs to be shared that cannot be shared over a wireless network (for whatever reason), that information can be displayed via the same display protocols described above.

Thus, a host device 402 and an XR-enabled electronic device 404 could engage in the process 400 shown in FIG. 4 as follows. The operations shown in FIG. 4 can be performed using the dynamic optical communication system described above, and this system can function regardless of whether the host device 402 and the XR-enabled electronic device 404 have access to the Internet or a secure wireless network. This can be highly valuable where Internet access is not available due to security concerns or limits of cellular coverage. As shown in FIG. 4, the image sensor 418 and the pattern reader 416 of the XR-enabled electronic device 404 are activated during an operation 420. Once activated, the pattern reader 416 can observe and decode any QR codes or other optical patterns viewed by the image sensor 418 of the XR-enabled electronic device 404.

On the dynamic display 406, one or more optical patterns may be displayed during an operation 422. For example, in some embodiments, the host device 402 could cause the display 406 to present two optical patterns displayed interchangeably on a timer. One of the optical patterns could include a network address to the host device 402 and any desired attributes (such as game or other identifier, location, and session). Another of the optical patterns could represent an optical pattern used for localizing users. In other embodiments, only the optical pattern including the network address to the host device 402 and any desired attributes can be displayed. The display of the optical pattern(s) here could vary as needed or desired. For instance, the optical pattern(s) could be displayed continuously, periodically at a specified interval, or in response to detected events (such as detecting the presence of the user or the XR-enabled electronic device 404).

The XR-enabled electronic device 404 may be unable to understand or use the localizing optical pattern, but the XR-enabled electronic device 404 can decode the optical pattern containing the network address and attributes. This optical pattern contains the necessary information needed for the XR-enabled electronic device 404 to begin the process of accessing a hosted experience. As a result, when the correct optical pattern is shown, the XR-enabled electronic device 404 decodes the information and sends a request to the host device 402 during an operation 424, such as by generating a first HTTP request having the same format shown above. Along with attributes contained in the optical pattern, the request can also have information about the XR-enabled electronic device 404 itself, such as browser session data. The XR-enabled electronic device 404 can then wait or be rerouted to another network address that contains information on how to read future patterns. This level of security can be up to the host provider.

When the host device 402 receives the initial request from the XR-enabled electronic device 404, the host device 402 reads the session-based attributes and the XR device-based attributes. Depending on the approach, a unique one-time token pattern can be generated during an operation 426, and the token may be represented using a QR code or other optical code. A message is sent to the dynamic display 406 to show this optical code or to otherwise display the token, and the display 406 presents this optical code/token during an operation 428. Note that the order of the displayed optical codes and the length of time for each optical code may vary as needed or desired.

The XR-enabled electronic device 404 observes the displayed optical code and decodes the token during an operation 430. The XR-enabled electronic device 404 then sends another message to the host device 402 (or other device identified in the optical code containing the token) with this information. Assuming the host device 402 verifies that the token in the second message is correct, the host device 402 validates the XR-enabled electronic device 404, at least for this session and perhaps for future sessions. If needed, the host device 402 sends another optical pattern to the dynamic display 406 providing session information, including where to load an application and/or assets, during an operation 432. The XR-enabled electronic device 404 can load the application/assets and initiate execution of the application or use of the assets during an operation 434.

At this point, the XR-enabled electronic device 404 may have all that is needed to join a hosted session. However, the XR-enabled electronic device 404 still needs to be localized with respect to the display 406 or other reference location. As a result, the host device 402 can initiate the display of a localization pattern on the display 406 during an operation 436. This pattern can be used to optically localize all XR-enabled electronic devices 404 in the vicinity (or at least those that have properly completed the earlier operations) to a single point of origin in order to spatially synchronize all participants in that session. In response, the XR-enabled electronic device 404 observes and sets it orientation relative to the displayed pattern during an operation 438.

If any other information needs to be communicated from the host device 402 to the XR-enabled electronic device 404 that cannot be done in other ways (such as via wireless communications), this information could be presented on the display 406 during an operation 440. This information may or may not be communicated using encoded optical patterns. Once completed or if no other information needs to be communicated, the process 400 can return to operation 422. At that point, the host device 402 could return to showing the optical pattern with the network information (and optionally a localization pattern intermittently).

In other embodiments, optical patterns can be displayed via the display 406, where those optical patterns have been predefined to allow spatial localization for all XR-enabled electronic devices 404 that observe the patterns. Part of the information in the patterns may contain data, such as a QR code. This data can provide instructions to access the host device 402 (possibly wirelessly) or raw data that can be used by an HMD OS or other OS 414. Since a single QR code typically cannot send enough information, the data encoded into the optical patterns can be refreshed to provide more data. As such, the first QR code or other optical pattern may contain information provided to the OS 414 on how to read upcoming codes, and subsequent QR codes or other optical patterns may contain additional information. One can also have multiple communication channels, such as one channel (which could be part of the tracking/localization pattern) having an optical pattern that provides an optical communication protocol and timing state information and at least one other channel having optical pattern(s) containing QR codes or other codes with the data. This allows users to access a stream of optically-displayed data at any time. Included in this code can be one or more uniform resource locators (URLs) or other links to access even larger datasets if required or desired.

It should be noted here that the host device 402 and the display 406 do not need to represent fixed devices. In some embodiments, for example, the host device 402 and display 406 could represent a tablet computer, smartphone, smart watch, or other mobile device that can be held or otherwise positioned by one user while other users view the display 406 of the mobile device. Here, the mobile device itself could be used to serve XR-related content to one or more XR-enabled electronic devices 404, or the mobile device could be used to provide information to and localize the XR-enabled electronic devices 404 while the XR-enabled electronic devices 404 interact with another source that serves XR-related content. In general, the approaches described in this patent document can be implemented using any suitable host device 402 and any suitable display 406 (which may or may not form part of the same device).

It should also be noted here that while game or other identifier, location, and session attributes are described above, any other or additional attribute(s) can be encoded into one or more QR codes or other optical patterns, and the attribute(s) can be used to support various functions. For example, an optical pattern being displayed may include information about a user group, such as demographic information (like age, gender, interests, etc.). When this optical pattern is scanned, the XR-enabled electronic device 404 may connect with the host 402 only after determining that a user of the XR-enabled electronic device 404 satisfies the demographic information or other user group information. As a particular example, an optical pattern may include a content rating, such as a rating that says the XR-enabled content has been rated for people thirteen years old or older (or some other age rating). The XR-enabled electronic device 404 may then check a user profile and connect to the host 402 or present XR-enabled content to the user only if the user's age in the profile satisfies the rating criterion. As another particular example, an optical pattern may include a user access level within a company or other organization or environment. The XR-enabled electronic device 404 may then check a user profile and connect to the host 402 or present XR-enabled content to the user only if the user is cleared (meaning the user's access level satisfies the access level restriction). There are countless other examples in which different XR-related content can be shown to different groups of users in a large audience. As yet another particular example, an optical pattern may include a request to trace a user, such as by following the user's actions in a given environment. The XR-enabled electronic device 404 may check a user profile, ask the user for permission to be traced, or ask the user to confirm the user's status or demographic, and the XR-enabled electronic device 404 may then inform the host 402 of the tracing decision, permission, status, or other response.

Although FIG. 4 illustrates one example of a process 400 for coded pattern communication, various changes may be made to FIG. 4. For example, the order of the operations 420-440 shown in FIG. 4 can vary as needed or desired. As a particular example, the network information and localization patterns could be presented in operation 424 prior to the XR-enabled electronic device 404 activating the image sensor 418 and pattern reader 416 in operation 422. As another particular example, the XR-enabled electronic device 404 could be localized before transmitting the first request and/or the second request to the host device 402.

Figure 5A:
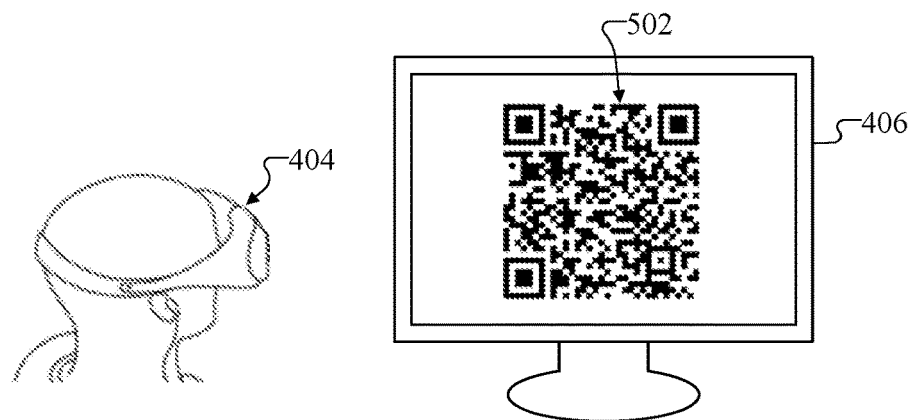
FIGS. 5A, 5B, and 5C illustrate a first example of coded pattern communications in accordance with this disclosure.
Figure 5B:
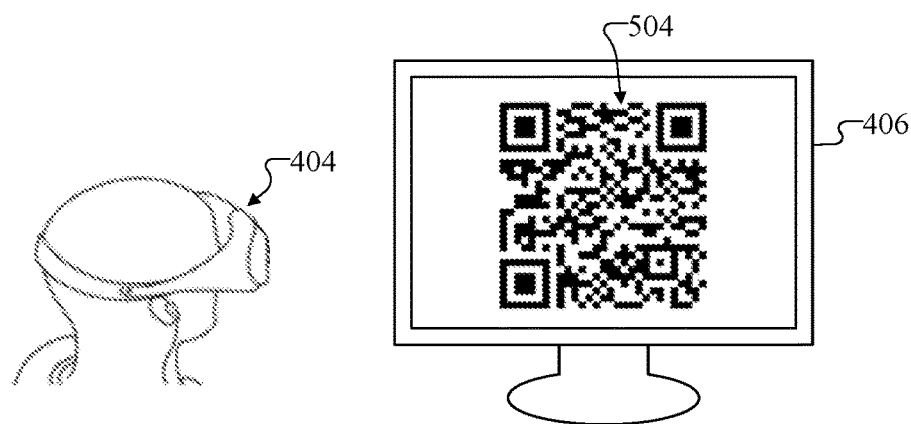
Figure 5C:
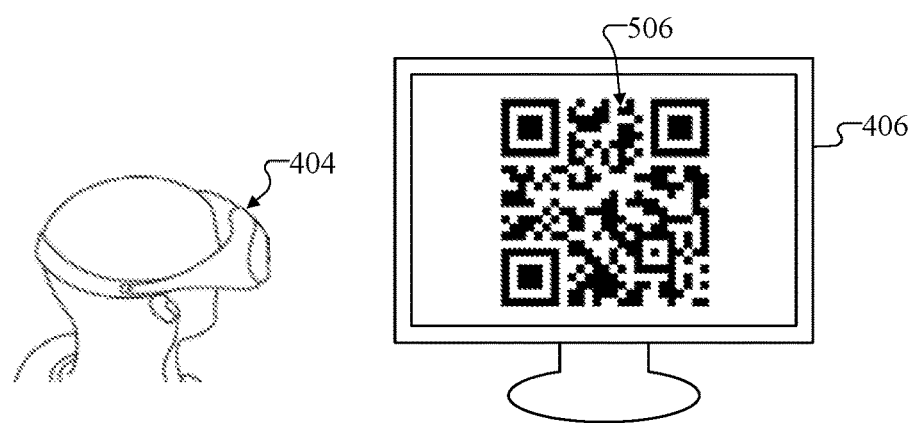

FIGS. 5A, 5B, and 5C illustrate a first example of coded pattern communications in accordance with this disclosure. In this example, a user using an XR-enabled electronic device 404 views a display 406 containing a first optical pattern 502 as shown in FIG. 5A. The first optical pattern 502 could include a network address to a host device 402 and any desired attributes (such as game or other identifier, location, and session identifier). The XR-enabled electronic device 404 can decode this information and send a first request to the host device 402 at the network address, where the first request contains the decoded attributes and any attributes of the XR-enabled electronic device 404 (such as browser session data).

Based on the first request, the host device 402 generates and presents a second optical pattern 504 on the display 406 as shown in FIG. 5B. The second optical pattern 504 could include a token or other unique identifier associated with the XR-enabled electronic device 404. The XR-enabled electronic device 404 can decode this information and send a second request to the host device 402 at the same network address (or a different network address if one is included in the second optical pattern 504). The second request may contain the token or information derived from the token, which allows the host device 402 to authenticate or authorize the XR-enabled electronic device 404.

The host device 402 also generates and presents a third optical pattern 506 on the display 406 as shown in FIG. 5C. The third optical pattern 506 can be processed by the XR-enabled electronic device 404 in order to identify where the XR-enabled electronic device 404 is located relative to the displayed optical pattern 506. For example, the XR-enabled electronic device 404 could use the shape of the optical pattern 506 to determine whether the optical pattern 506 is being viewed head-on or at an angle (horizontal and/or vertical). The XR-enabled electronic device 404 could also use the size of the optical pattern 506 to determine an estimated distance to the display 406.

Thus, by using the optical patterns 502, 504, 506, the XR-enabled electronic device 404 is able to access the host device 402 and, if necessary, identify its location relative to a reference location. This can be accomplished without requiring the XR-enabled electronic device 404 to have access to a secured wireless network or a cloud-based server.

Figure 6:
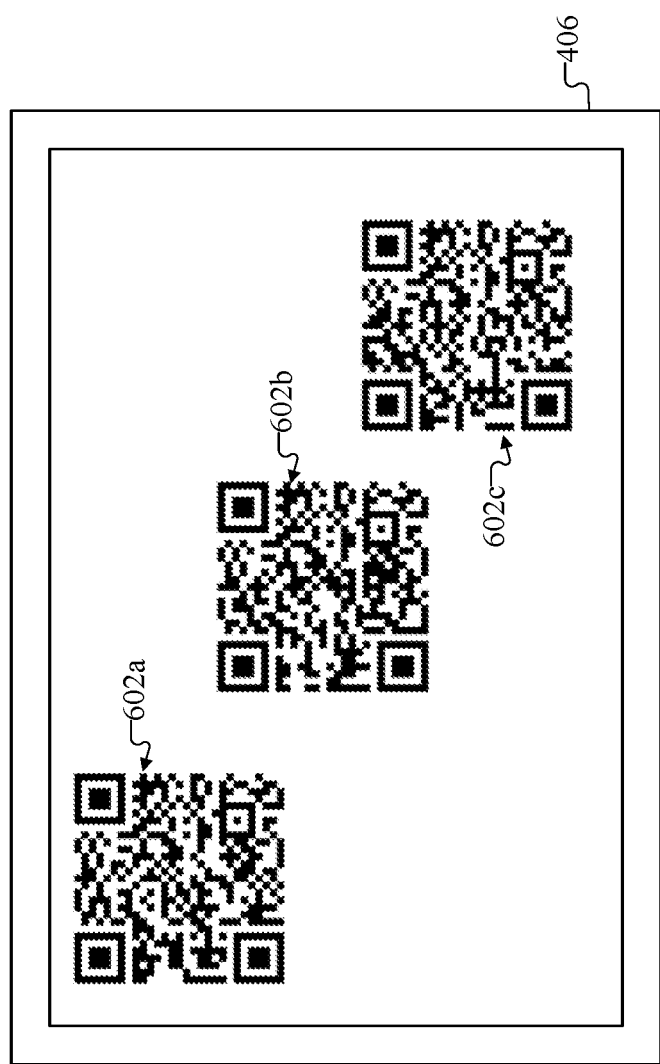
FIG. 6 illustrates a second example of coded pattern communications in accordance with this disclosure.
Figure 6:
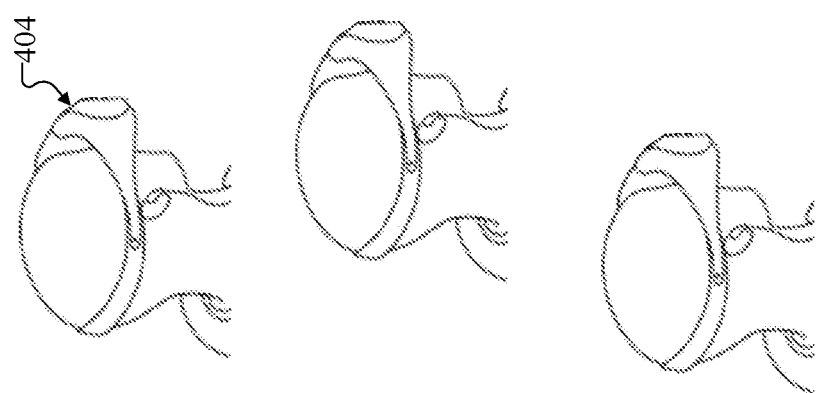
Figure 7:
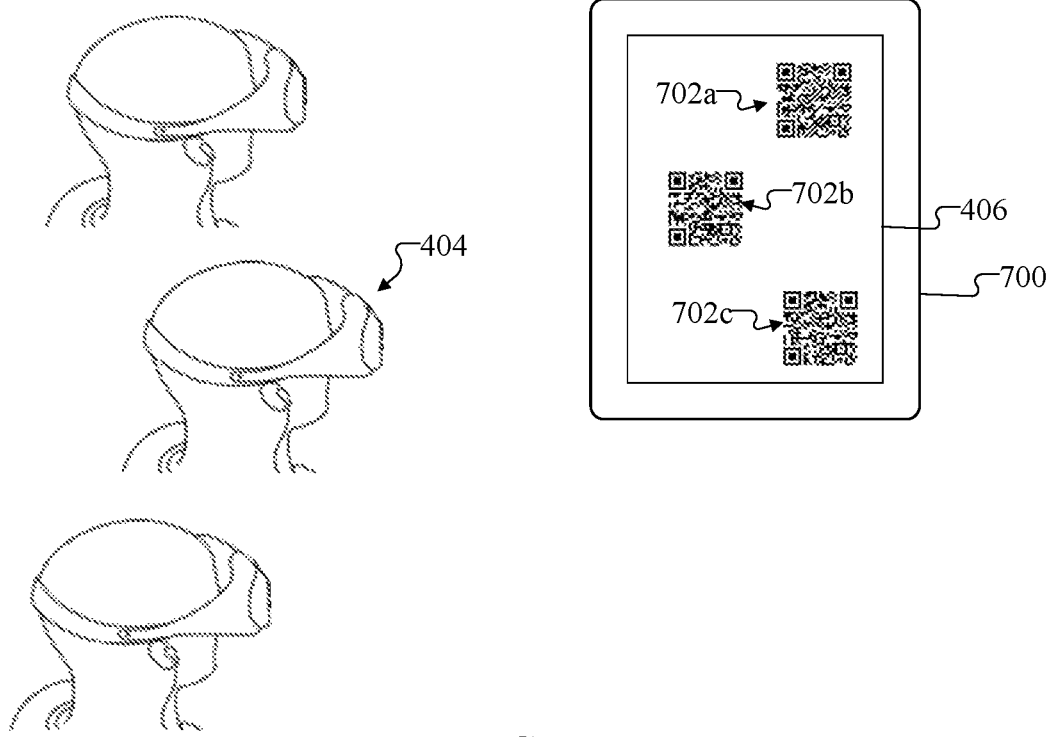
FIG. 7 illustrates a third example of coded pattern communications in accordance with this disclosure.

FIG. 6 illustrate a second example of coded pattern communications in accordance with this disclosure, and FIG. 7 illustrates a third example of coded pattern communications in accordance with this disclosure. Multiple users are using multiple XR-enabled electronic devices 404 to view a large display 406 in FIG. 6, while one or more users are using one or more XR-enabled electronic devices 404 to view a display 406 of a mobile device 700 (such as a tablet computer, smartphone, smart watch, or other display device) in FIG. 7.

In some embodiments, each display 406 in FIGS. 6 and 7 can present multiple optical patterns 602a-602c, 702a-702c for multiple users to view with their XR-enabled electronic devices 404. The optical patterns presented on each display 406 can vary, such as by using the same pattern shown in FIGS. 5A, 5B, and 5C. For example, each user could be instructed to hold his or her view on a certain area of the display 406, allowing the user to view the same three types of optical patterns 502, 504, 506 described above in that area of the screen. Of course, only one or more of the optical patterns 502, 504, 506 described above may need to be displayed in different areas of the display 406. At least one of the optical patterns (such as the pattern 506 used for localization) could be presented in the entire display 406 or a portion thereof and be viewed by all users.

In other embodiments, all users could simply view the same area of the display 406, and the host device 402 could process requests from the XR-enabled electronic devices 404. Although each XR-enabled electronic device 404 would decode the same optical patterns and send requests to the host device 402, the initial requests from the XR-enabled electronic devices 404 can include information specific to each XR-enabled electronic device 404, and the generated tokens would be specific to individual XR-enabled electronic devices 404. Thus, for example, the host device 402 could receive requests containing the same token from different XR-enabled electronic devices 404, allowing the host device 402 to accept the request from only one XR-enabled electronic device 404 (which was actually associated with the token) and reject the other requests. The rejected XR-enabled electronic devices 404 could then repeat the process until all XR-enabled electronic devices 404 have been authenticated/authorized.

In still other embodiments, the host device 402 could provide the same first optical pattern (containing the network address of the host device 402 and one or more attributes) to all users. When an XR-enabled electronic device 404 provides the first request to the host device 402, the second optical pattern for that XR-enabled electronic device 404 could include information unique to that XR-enabled electronic device 404. The XR-enabled electronic device 404 could therefore determine that the second optical pattern is intended for that XR-enabled electronic device 404, while other XR-enabled electronic devices 404 could ignore that optical pattern.

As can be seen here, there are various ways in which optically-coded patterns can be used to support communications between one or more host devices 402 and one or more XR-enabled electronic devices 404. The ways in which the optical patterns are displayed can vary widely based on a number of factors. For example, one or more optical patterns could be displayed quickly or for longer periods of time within a larger image or video sequence, or optical patterns could be displayed within a short period of time of detecting a user's gaze (which can be detected using standard gaze detection techniques). The frequencies at which optical patterns change or the lengths of time that the optical patterns are displayed can vary, such as when based on what might be perceived to be acceptable by end users. Examples can include when optical patterns change frequently enough to allow suitably fast access to the host device 402 or the XR-related content but without changing so frequently as to be annoying to viewers. This is obviously viewer-dependent, so different implementations may have different frequencies or timings. The minimum length of time for displaying an optical pattern can be based on the length of time it might take for an average user to notice and view the optical pattern and the speed at which the pattern reader 416 can detect and decode the optical pattern.

Not only that, there are numerous applications in which this functionality can be used, and the applications do not necessarily need to follow the same use of the optical patterns described above. For example, to support single-player or multi-player gameplay, the host device 402 can interact with one or more XR-enabled electronic devices 404 to authorize the XR-enabled electronic device(s) 404 and localize the XR-enabled electronic device(s) 404 within a given space. Once ready, the host device 402 or another device can initiate gameplay, and each authorized user is able to participate in the gameplay from his or her respective position. When supporting multi-player gameplay, the host device 402 could represent a tablet computer, smartphone, smart watch, or other display device, which would allow the gameplay to occur in any suitable area where the host device 402 and the XR-enabled electronic devices 404 can be used.

As another example, a display positioned outside or within a store (or collection of stores) could present an optical pattern allowing different XR-enabled electronic devices 404 to access a local host device 402. When the XR-enabled electronic devices 404 access the host device 402, the host device 402 could present each XR-enabled electronic device 404 with one or more advertisements, coupons, or information about one or more sales or products, and this information can be delivered using one or more additional optical codes. The information provided to each XR-enabled electronic device 404 could vary, such as based on prior browser histories or shopping histories of the users associated with the XR-enabled electronic devices 404. Multiple coded patters (such as those based on color and/or motion that is within and/or beyond human vision) can be used to communicate to the viewer, and a variety of subtractive and additive stenographic techniques or other techniques can be employed to further obfuscate the coded pattern(s) from users.

As yet another example, a virtual "walk-through" of a floorplan, an interior design for a home or building, or a display associated with another space could be supported using multiple XR-enabled electronic devices 404 of different users. Once the XR-enabled electronic devices 404 are authenticated/authorized and localized (such as by using any of the techniques described above), the XR-enabled electronic devices 404 can be used to conduct the walk-through.

As still another example, at a music concert or other large gathering in which entertainment content or other content is being provided to a large number of users, one or more ultra-large multi-monitor displays can be used to communicate with the users' XR-enabled devices. The display(s) can be used to send unique codes and timing patterns based on the music performance or other presentation of the content. Again, the patterns may be obfuscated (such as based on other visual content) so that the users do not notice that the patterns are being displayed.

One example benefit of the approaches described in this disclosure (in these or other applications) is that access to a host device 402 can be limited to local XR-enabled electronic devices 404. The optical patterns presented on a display 406 can only be viewed by XR-enabled electronic devices 404 that are within viewing distance of the display 406. Users who are not present around the display 406 cannot view the optical patterns and decode the information contained in the patterns. Even if the optical patterns or decoded information was transmitted from one local device to a remote device, the network address for the host device 402 may allow access only by local XR-enabled electronic devices 404, such as when the XR-enabled electronic devices 404 can only access the host device 402 using a private network address (like 192.168.xxx.xxx). Even if a remote device obtained the optical patterns or decoded information, the remote device could not access the private network address of the host device 402 without being in the area. This helps to provide improved security, which can be very useful in various applications.

Although FIGS. 5A, 5B, 5C, 6, and 7 have illustrated examples of coded pattern communications, various changes may be made to these figures. For example, the order of optical pattern generation/display can vary as needed or desired. As a particular example, an XR-enabled electronic device 404 could possibly localize its position relative to the display 406 before sending a first request to the host device 402 with various attributes and/or before sending a second request to the host device 402 with a token.

Figure 8:
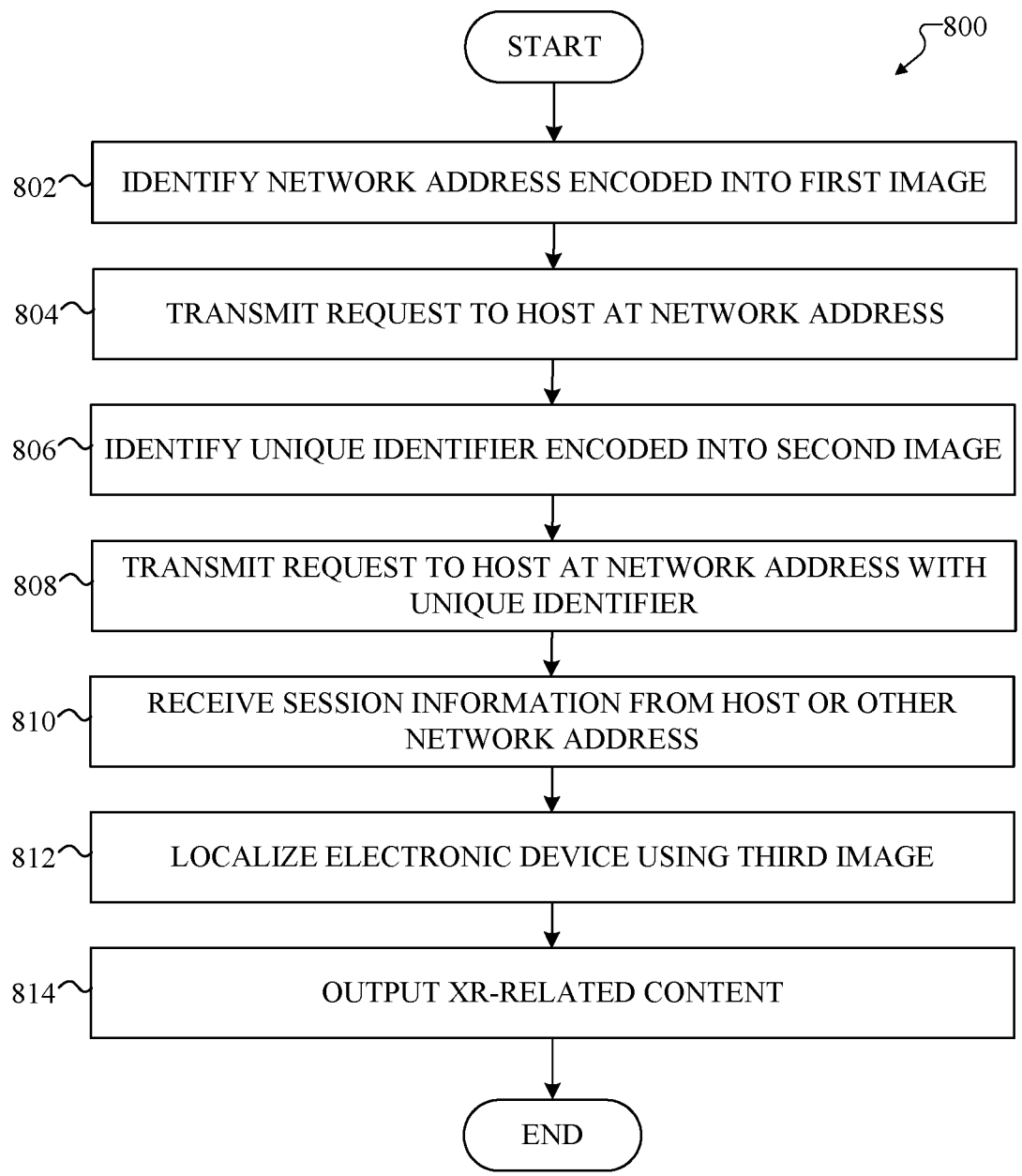
FIG. 8 illustrates an example method for coded pattern communications using an end-user electronic device in accordance with this disclosure.

FIG. 8 illustrates an example method 800 for coded pattern communications using an end-user electronic device in accordance with this disclosure. For ease of explanation, the method 800 is described as involving the use of the XR-enabled electronic device 404, which could be implemented in various ways as shown in FIGS. 1, 2, and 3. However, the method 800 could be performed using any other suitable XR-enabled electronic device.

As shown in FIG. 8, a network address encoded into a first image is identified at step 802. This could include, for example, a user of the XR-enabled electronic device 404 aiming the image sensor 418 of the XR-enabled electronic device 404 at a display 406 that is presenting a first QR code or other optical pattern. This could also include the processor 120 or controller 240 of the XR-enabled electronic device 404 executing the pattern reader 416 to analyze the image of the first optical pattern and extract encoded information from the first optical pattern. As noted above, the decoded information could include the network address of a host and optionally one or more attributes (such as game or other identifier, location, and session). A request is transmitted to the host device at the network address at step 804. This could include, for example, the processor 120 or controller 240 of the XR-enabled electronic device 404 generating an HTTP request (possibly with the one or more decoded attributes) and sending the HTTP request to the network address of the host device 402.

A unique identifier encoded into a second image is identified at step 806. This could include, for example, the user of the XR-enabled electronic device 404 aiming the image sensor 418 of the XR-enabled electronic device 404 at a display 406 that is presenting a second QR code or other optical pattern. This could also include the processor 120 or controller 240 of the XR-enabled electronic device 404 executing the pattern reader 416 to analyze the image of the second optical pattern and extract encoded information, such as a token or other unique identifier, from the second optical pattern. Another request containing the unique identifier is transmitted to the host device at the network address at step 808. This could include, for example, the processor 120 or controller 240 of the XR-enabled electronic device 404 generating an HTTP request with the token or other unique identifier and sending the HTTP request to the network address of the host device 402. Note, however, that this request could also be directed to a different network address, such as when a different network address is encoded in the second optical pattern.

Session information is received from the host or a device at another network address at step 810. This could include, for example, the processor 120 or controller 240 of the XR-enabled electronic device 404 receiving application code, content, or a webpage address having XR-related content from the host device 402. This could also include the processor 120 or controller 240 of the XR-enabled electronic device 404 executing the application code or visiting the webpage.

The electronic device is localized using a third image at step 812. This could include, for example, the user of the XR-enabled electronic device 404 aiming the image sensor 418 of the XR-enabled electronic device 404 at a display 406 that is presenting a third QR code or other optical pattern. This could also include the processor 120 or controller 240 of the XR-enabled electronic device 404 analyzing the image of the third optical pattern to estimate a location of the XR-enabled electronic device 404 relative to the displayed third optical pattern. At that point, the XR-enabled electronic device 404 may be ready to join in an XR-related experience. For instance, the electronic device can output XR-related content at step 814. This could include, for example, the processor 120 or controller 240 of the XR-enabled electronic device 404 receiving XR-related content and associated states and events and presenting the XR-related content on at least one display.

Figure 9:
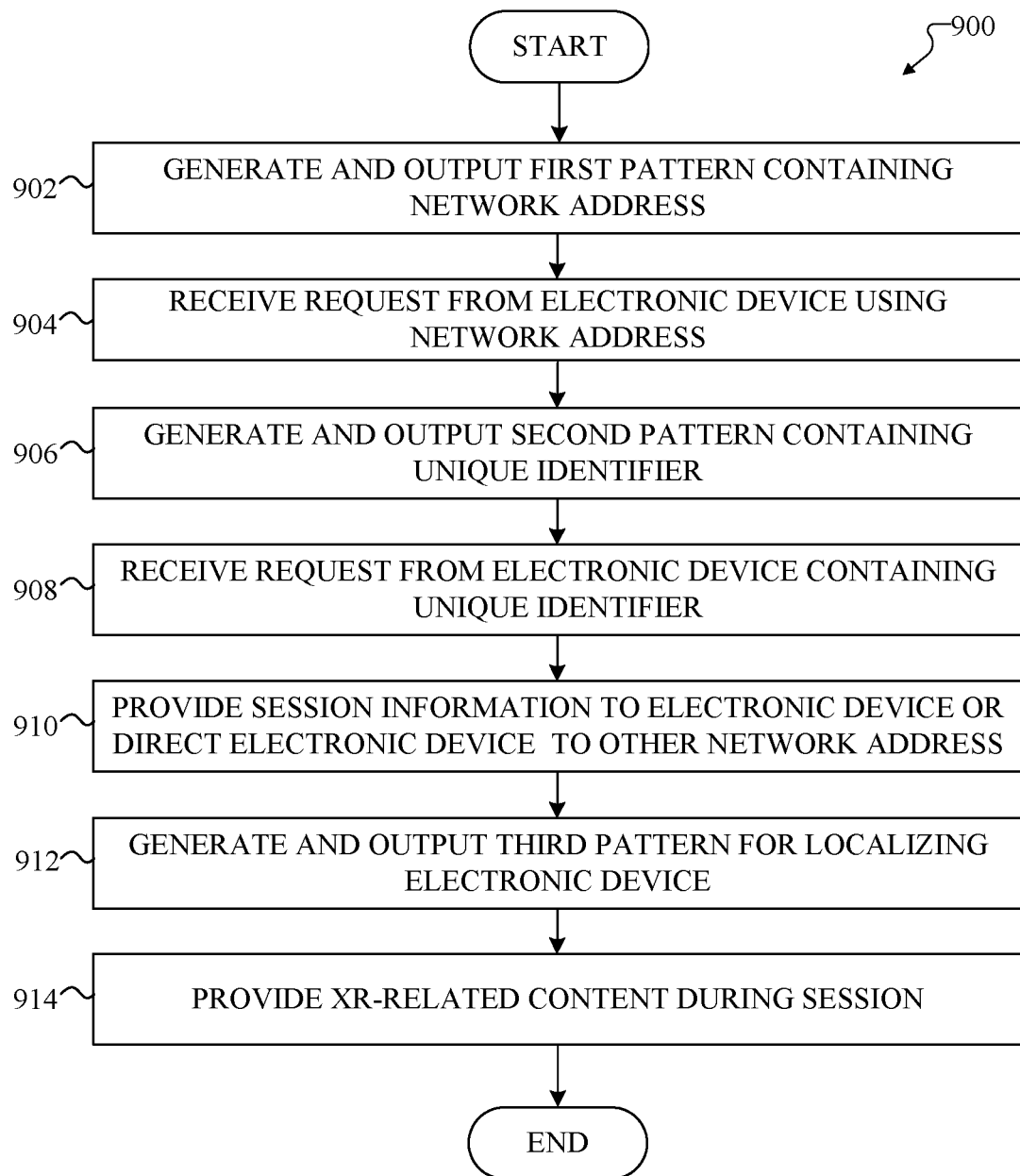
FIG. 9 illustrates an example method for coded pattern communications using a host electronic device in accordance with this disclosure.

FIG. 9 illustrates an example method 900 for coded pattern communications using a host electronic device in accordance with this disclosure. For ease of explanation, the method 900 is described as involving the use of the host device 402, which could be implemented in various ways as shown in FIGS. 1, 2, and 3. However, the method 900 could be performed using any other suitable host device.

As shown in FIG. 9, a first optical pattern containing at least a network address of a host device is generated and outputted at step 902. This could include, for example, the processor 120 or controller 240 of the host device 402 generating a first QR code or other optical pattern encoding a private network address of the host device 402 and optionally one or more desired attributes (such as game or other identifier, location, and session). This could also include the processor 120 or controller 240 of the host device 402 outputting the first QR code or other optical pattern to at least one display 406. A request is received from an electronic device at the network address at step 904. This could include, for example, the processor 120 or controller 240 of the host device 402 receiving an HTTP request from an XR-enabled electronic device 404. The HTTP request may include the one or more attributes encoded in the first optical pattern and attributes related to the XR-enabled electronic device 404 (such as browser session data).

A unique identifier is generated and outputted at step 906. This could include, for example, the processor 120 or controller 240 of the host device 402 performing a cryptographic hash function or other operation using various data (possibly including the browser session data) to generate a token or other unique identifier for the XR-enabled electronic device 404. This could also include the processor 120 or controller 240 of the host device 402 generating a second QR code or other optical pattern encoding the token or other unique identifier. This could further include the processor 120 or controller 240 of the host device 402 outputting the second QR code or other optical pattern to the at least one display 406.

A request containing the token or other unique identifier is received from the electronic device at step 908. This could include, for example, the processor 120 or controller 240 of the host device 402 receiving an HTTP request containing the token or other unique identifier. Session information is provided to the electronic device or the electronic device is directed to another network address for session information at step 910. This could include, for example, the processor 120 or controller 240 of the host device 402 verifying that the token contained in the second request was received from the same XR-enabled electronic device 404 associated with the token. This could optionally also include the processor 120 or controller 240 of the host device 402 determining whether the XR-enabled electronic device 404 associated with the token has been pre-approved for access to the session. This could further include the processor 120 or controller 240 of the host device 402 providing application code, content, or a webpage address having XR-related content to the XR-enabled electronic device 404.

A third optical pattern is generated and outputted at step 912. This could include, for example, the processor 120 or controller 240 of the host device 402 generating a third QR code or other optical pattern used by the XR-enabled electronic device 404 to localize the electronic device 404 relative to a reference location, such as a displayed position of the third optical pattern. This could also include the processor 120 or controller 240 of the host device 402 outputting the third optical pattern to the at least one display 406. Once localized, the host or other content provider may provide XR-related content to the electronic device during the session at step 914. This could include, for example, the processor 120 or controller 240 of the host device 402 or another device providing XR-related content (including states and events) to the XR-enabled electronic device 404.

Although FIGS. 8 and 9 illustrate examples of methods 800 and 900 for coded pattern communications using an end-user electronic device 404 and a host electronic device 402, various changes may be made to FIGS. 8 and 9. For example, while each figure shows a series of steps, various steps in each figure could overlap, occur in parallel, occur in a different order, or occur any number of times. Also, various steps shown in FIG. 9 could be repeated for different XR-enabled electronic devices 404, such as to process requests from the XR-enabled electronic devices 404 and to assign a different unique identifier to each of the XR-enabled electronic devices 404. In addition, while FIGS. 8 and 9 have been described as using a single image or optical pattern to obtain specific information, multiple images or optical patterns may be used to encode the specific information.

The embodiments described above are not meant to be limiting and are merely illustrative of various aspects of this disclosure. While example embodiments may be indicated as applicable to a particular device category (such as head-mounted displays, servers, etc.), the processes and examples provided above are not intended to be solely limited to those device categories and can be broadly applicable to various device categories (such as appliances, mobile devices, computers, automobiles, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. An apparatus comprising:
   at least one image sensor configured to capture a plurality of images;
   at least one communication interface;
   at least one display; and
   at least one processor coupled to the at least one image sensor, the at least one communication interface, and the at least one display, the at least one processor configured to:
      identify a network address encoded into a first optical pattern within one or more first images of the plurality of captured images;
      transmit a first request to the network address;
      identify a unique identifier encoded into a second optical pattern within one or more second images of the plurality of captured images;
      transmit a second request containing the unique identifier;
      receive session information; and output, to the at least one display, extended reality-related content obtained during a session associated with the session information.

2. The apparatus of claim 1, wherein:
the at least one processor is further configured to identify a position of the apparatus relative to a reference location based on one or more third images of the plurality of captured images; and
the output of the extended reality-related content is based on the identified position.

3. The apparatus of claim 1, wherein:
the session information comprises application code or a webpage address; and
the at least one processor is further configured to establish the session by loading and executing the application code or visiting the webpage address.

4. The apparatus of claim 1, wherein:
to identify the network address, the at least one processor is configured to decode a first Quick Response (QR) code contained in the one or more first images of the plurality of captured images; and
to identify the unique identifier, the at least one processor is configured to decode a second QR code contained in the one or more second images of the plurality of captured images.

5. The apparatus of claim 1, wherein:
the first request comprises a first HyperText Transport Protocol (HTTP) request containing the network address; and
the second request comprises a second HTTP request containing the unique identifier.

6. A method comprising:
identifying a network address encoded into a first optical pattern within one or more first captured images using at least one processor;
transmitting a first request to the network address;
identifying a unique identifier encoded into a second optical pattern within one or more second captured images using the at least one processor;
transmitting a second request containing the unique identifier;
receiving session information; and
outputting extended reality-related content obtained during a session associated with the session information using the at least one processor.

7. The method of claim 6, further comprising identifying a position of an electronic device that includes the at least one processor relative to a reference location using one or more third captured images;
wherein the extended reality-related content is presented based on the identified position.

8. The method of claim 6, further comprising identifying one or more attributes encoded into the one or more first captured images using the at least one processor;
wherein the first request includes the one or more attributes.

9. The method of claim 6, wherein:
identifying the network address comprises decoding a first Quick Response (QR) code contained in the one or more first captured images; and
identifying the unique identifier comprises decoding a second QR code contained in the one or more second captured images.

10. The method of claim 6, wherein:
the first request comprises a first HyperText Transport Protocol (HTTP) request containing the network address; and
the second request comprises a second HTTP request containing the unique identifier.

11. An apparatus comprising:
at least one communication interface; and
at least one processor coupled to the at least one communication interface, the at least one processor configured to:
generate one or more first optical patterns encoding a network address;
output, to at least one display, the one or more first optical patterns;
receive a first request at the network address from an electronic device;
generate a unique identifier;
generate one or more second optical patterns encoding the unique identifier; and
output, to the at least one display, the one or more second optical patterns.

12. The apparatus of claim 11, wherein the at least one processor is further configured to:
receive a second request containing the unique identifier from the electronic device;
verify that the electronic device is authorized to access a session involving extended reality-related content; and
provide session information to the electronic device.

13. The apparatus of claim 12, wherein:
the first request comprises a first HyperText Transport Protocol (HTTP) request containing the network address; and
the second request comprises a second HTTP request containing the unique identifier.

14. The apparatus of claim 11, wherein the at least one processor is further configured to:
generate one or more third optical patterns for localizing at least the electronic device relative to a reference location; and
output, to the at least one display, the one or more third optical patterns.

15. The apparatus of claim 11, wherein the at least one processor is configured to:
receive multiple first requests at the network address from multiple electronic devices;
generate multiple unique identifiers each associated with a different one of the multiple electronic devices;
generate multiple second optical patterns encoding the multiple unique identifiers; and
output, to the at least one display, the multiple second optical patterns.

16. A method comprising:
generating one or more first optical patterns encoding a network address using at least one processor;
outputting, to at least one display, the one or more first optical patterns;
receiving a first request at the network address from an electronic device;
generating a unique identifier using the at least one processor;
generating one or more second optical patterns encoding the unique identifier using the at least one processor; and
outputting, to the at least one display, the one or more second optical patterns.

17. The method of claim 16, further comprising:
receiving a second request containing the unique identifier from the electronic device;

verifying that the electronic device is authorized to access a session involving extended reality-related content; and providing session information to the electronic device.

18. The method of claim 17, wherein:

the first request comprises a first HyperText Transport Protocol (HTTP) request containing the network address; and the second request comprises a second HTTP request containing the unique identifier.

19. The method of claim 16, further comprising:

generating one or more third optical patterns for localizing at least the electronic device relative to a reference location using the at least one processor; and outputting, to the at least one display, the one or more third optical patterns.

20. The method of claim 16, further comprising:

receiving multiple first requests at the network address from multiple electronic devices;

generating multiple unique identifiers each associated with a different one of the multiple electronic devices;

generating multiple second optical patterns encoding the multiple unique identifiers; and outputting, to the at least one display, the multiple second optical patterns.

* * * * *